No. 736,889. PATENTED AUG. 18, 1903.
W. M. SMITH.
VALVE GEAR FOR COMPOUND LOCOMOTIVE ENGINES.
APPLICATION FILED MAY 19, 1902.
NO MODEL.

No. 736,889. Patented August 18, 1903.

UNITED STATES PATENT OFFICE.

WALTER MACKERSIE SMITH, OF NEWCASTLE-UPON-TYNE, ENGLAND.

VALVE-GEAR FOR COMPOUND LOCOMOTIVE-ENGINES.

SPECIFICATION forming part of Letters Patent No. 736,889, dated August 18, 1903.

Original application filed April 10, 1901, Serial No. 55,261. Divided and this application filed May 19, 1902. Serial No. 108,080. (No model.)

*To all whom it may concern:*

Be it known that I, WALTER MACKERSIE SMITH, a subject of the King of Great Britain and Ireland, residing at Newcastle-upon-Tyne, in the county of Northumberland, England, have invented Improvements in the Valve-Gear of Compound Locomotive-Engines, of which the following is a specification.

This invention has reference to improvements in valve-gear for compound locomotive-engines whereby the steam supplied to the cylinders is controlled by a single set of valve-gear operated by only one eccentric.

The invention is particularly applicable to engines of the kind described in my other application, Serial No. 55,261, filed April 10, 1901, of which this application is a division, wherein two valves are reciprocated simultaneously.

Figure 1:
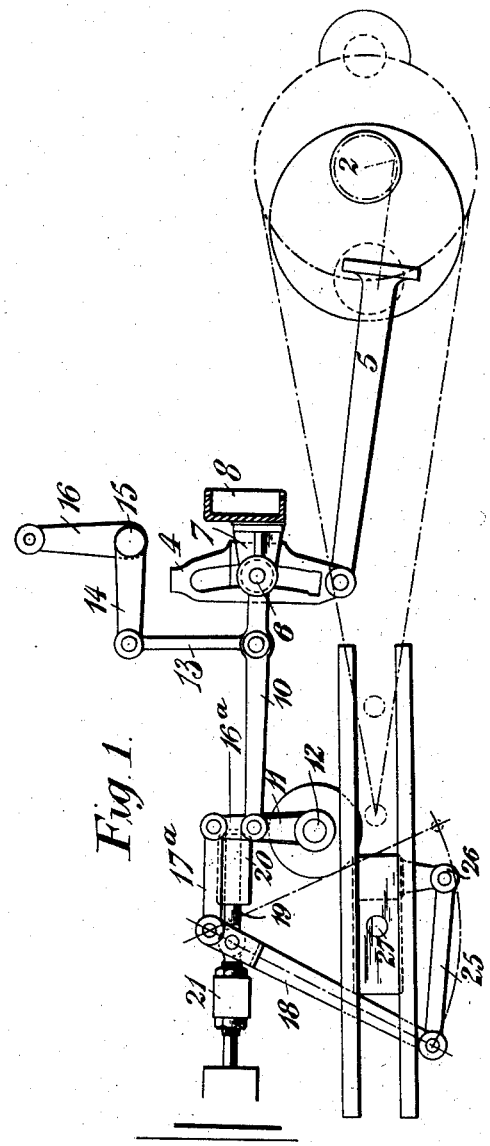
Figure 2:
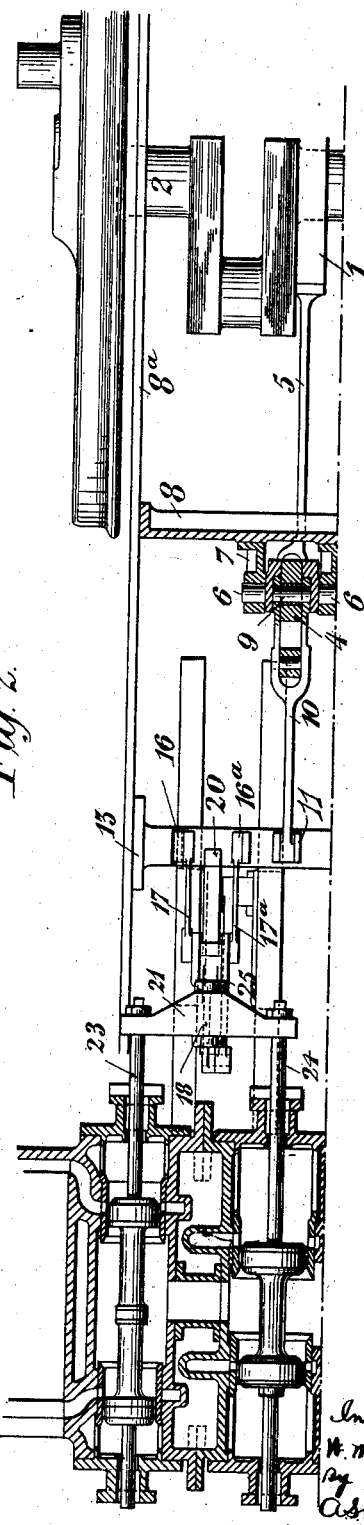

Referring to the accompanying illustrative drawings, Figures 1 and 2 show, respectively, in sectional elevation and sectional plan, valve-gear according to this invention.

The eccentric 1 is mounted on the crank-shaft 2 and is connected with the link 4 by means of an eccentric-rod 5. The link 4 is mounted on trunnions 6 in a bracket 7, secured to a beam 8, which extends transversely of the engine and is secured to the side framing $8^a$ thereof.

9 is the block or die which works in the slot in the link 4 and is carried by one end of an intermediate link 10, connected at its other end to an arm 11, fixed to a rock-shaft 12, mounted in bearings 13 in the side frames $8^a$. The intermediate link 10 is connected by a link 13 to an arm 14 on a shaft 15, an arm 16 of which is connected to the reversing-handle. The rock-shaft 12 has also fixed to it two other arms 16 and $16^a$, connected by links 17 and $17^a$ with the forked upper end of a lever 18. This lever is connected by a pivot-pin slightly below to a stem 19, one end of which works in a fixed guide-sleeve 20, Fig. 1, and the other end of which is connected to a cross-head 21, that rigidly connects together the two valve-spindles 23 and 24 and causes them when the cross-head is operated to move together. The lower end of the lever 18 is connected by a link 25 to a boss 26 on the cross-head 27 of the low-pressure piston-rod.

What I claim is—

In a compound locomotive-engine, the combination with a high-pressure cylinder and a low-pressure cylinder, and a separate valve and valve-chest for each cylinder, of a crank-shaft, a single eccentric on said crank-shaft, a link connected to and driven by said eccentric, a three-armed rock-shaft one arm of said shaft being connected to said link, and the other arms to a lever that is connected to a cross-head that connects said valves together so that they always move in the same direction, said lever being also connected with a reciprocating part of the engine, as set forth.

Signed at Newcastle-upon-Tyne this 7th day of May, 1902.

WALTER MACKERSIE SMITH.

Witnesses:
RALPH J. ROBSON,
JOHN WEATHERBURN.